Patented Jan. 4, 1938

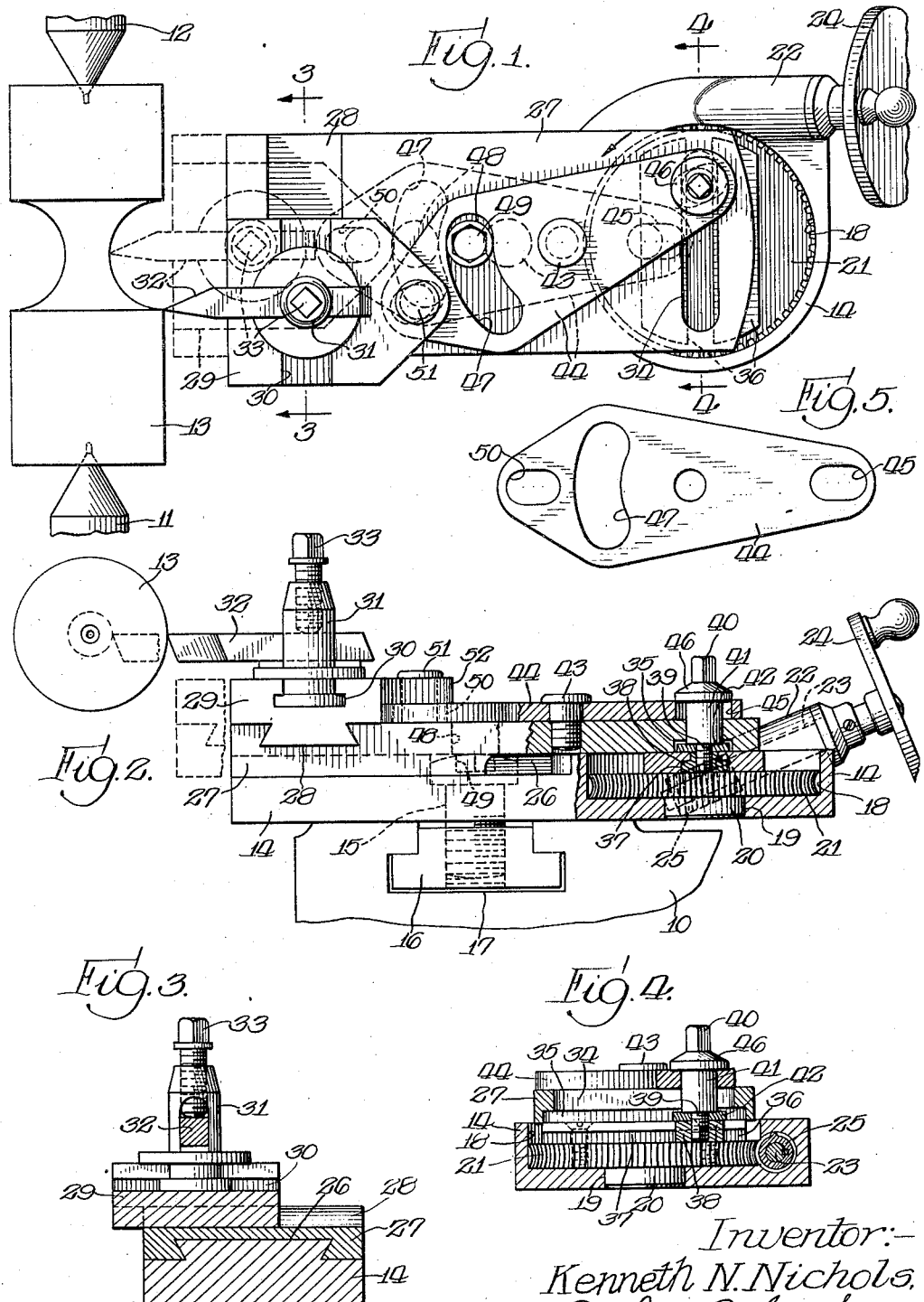

2,104,238

UNITED STATES PATENT OFFICE 2,104,238

LATHE TOOL

Kenneth N. Nichols, Chicago, Ill.

Application April 29, 1936, Serial No. 76,878

7 Claims. (Cl. 82—12)

The present invention relates generally to lathes or the like machine, but more particularly to a novel and improved lathe tool for automatically controlling the cutting edge so that the same will describe a semi-circle or a lesser portion of the arc of a perfect circle.

The primary object of the present invention is to provide a novel and improved lathe tool which is adapted to be mounted on a bed of a lathe and be adjusted so the tool thereof may cut semi-circular arcs of various radii from the material mounted in the lathe.

A further object of the invention is to provide a novel and improved construction of lathe tool in which a manually controlled mechanism is operatively connected to a cutting tool for automatically guiding the cutting edge of said tool to describe the arc of a perfect circle.

Another object of the invention is to provide a novel and improved lathe tool in which the tool is adapted to be adjusted so as to describe the arc of a perfect circle and provided with means for adjusting the various sizes of arcs through which the tool travels in its cutting operation.

These and other objects are accomplished by providing a construction and an arrangement of the various parts in the manner hereinafter described and particularly pointed out in the appended claims.

Referring to the drawing:

Fig. 1 is a top plan view of my improved lathe tool showing the manner in which it is operatively associated with a conventional lathe;

Fig. 2 is a side elevational view partly in cross section illustrating the construction of the device shown in Fig. 1;

Fig. 3 is a cross sectional view taken on the line 3—3 in Fig. 1;

Fig. 4 is a cross sectional view taken on the line 4—4 in Fig. 1; and

Fig. 5 is a top plan view showing the construction of the operating parts thereof.

In illustrating one form of my invention I have shown the same in connection with a conventional form of lathe, only a fragmentary portion of which is shown in Figs. 1 and 2 of the drawing. The lathe in this instance comprises the conventional carriage 10, a live center 11 and a dead center 12. Located between the live and dead center of the lathe is a piece of material 13 being worked upon. My improved lathe tool comprises a main frame or casting 14 which is secured to the bed 10 by means of a machine screw 15 extending through a central bore in the main frame 14. The lower threaded portion of the screw 15 engages a lock nut 16 which in turn conforms in configuration to the longitudinal recess 17 in the carriage 10 for securing the tool to the lathe. Located adjacent the outer end of and on the top side of the main frame 14 is a circular recess 18. Located concentrically with respect to the recess 18 in the main frame 14 is a central bore 19. Mounted in the recess 18 is a worm wheel 21. Formed integrally with the worm wheel 21 is a stud 20 which in turn is journaled in the bore 19. Formed integrally with the main frame 14 is an angularly disposed bearing barrel 22 in which is journaled a shaft 23. To the outer end of the shaft 23 is secured a manually or hand operated wheel 24. Secured to the inner end of the shaft and meshing with the worm wheel 21 is a worm 25. Longitudinally adjustable on the main frame member 14 by a dove-tail groove and dove-tail arrangement as shown generally by the reference character 26 is a movable member 27. Transversely movable on the inner end of the member 27 by a similar dove-tailed groove and tongue arrangement as shown at 28 is a tool supporting member 29. Located in the upper portion of the member 29 is a longitudinal groove 30 in which is adapted to be secured a conventional cutting tool clamp 31 for securing therein a cutting tool 32 by a set screw 33. Located adjacent the outer end of the sliding member 27 is a transverse slot 34 having an undercut recess 35 therearound adjacent the lower surface thereof. Secured to the upper surface of the worm wheel are two spaced apart guide bars 36 which are provided with longitudinal recesses 37 adjacent the inner lower edges as clearly shown in Fig. 2 of the drawing. Adjustably mounted between the guide bars 36 and conforming in configuration to the recess formed by these bars is a sliding rectangular nut 38. This sliding nut 38 is provided with a central threaded bore adapted to receive in threaded engagement with a threaded portion 39 of a lock bolt, generally indicated by the reference character 40. This lock bolt 40 has an enlarged barrel, as shown at 41, so that its lower shoulders engage a washer 42 for clamping the bolt 40 and nut to the inner flanges of each of the guide members 36. In this connection it will be noted that the enlarged barrel portion 41 of the bolt 40. Located adjacent the upper portion of the bolt 40 is an overhanging flange 46 which slidingly engages the upper surface of the lever 44 adjacent the slot 45. Located inwardly from and concentrically with respect to the pivot of the lever 44 is an arcuate slot 47. This slot 47 permits the entrance of a hexagonal wrench through an aperture 48 in the member 27 for engagement with a hexagonal recess 49 formed in the head of the screw 15. This arrangement permits the operator to secure or remove the device from the carriage 10 of the lathe. The forward end of the lever 44 is provided with a relatively short elongated slot 50 which is adapted to engage a pin 51 secured to a forwardly projecting ear 52 formed integrally with the transversely movable member 29.

The operation of my improved lathe tool is as follows:

Let us assume that the live center 11 of the lathe is revolving the material 13 mounted in the lathe and that upon a manipulation of the hand wheel 24 in one direction the worm wheel 21 is revolved in a direction indicated by the arrow in Fig. 1 of the drawing. As the shoulder bolt 40 is revolved about the axis of the gear 21 on the stud 20 from the full line position to the dotted line position shown in Fig. 1, the enlarged portion 41 of the bolt which extends through the slots 34 and 45 of the member 27 and lever 44 respectively actuate the lever 44 and the longitudinal reciprocal member 27 from full line position to dotted line position shown in Figs. 1 and 2. At the same time, the lower portion of the pin 51 will engage the outer end of the elongated slot 50 in the lever 44 and cause the transversely movable slide member 29 to move transversely with respect to the longitudinally movable slide member 27 so that this member assumes the dotted line position shown in Fig. 1 which results in causing the cutting edge of the tool to describe the arc of a perfect circle or semi-circle upon a half revolution of the worm wheel 27. In this connection it will be noted that the diameter or radius of the arc of the circle being cut from the material may be enlarged or reduced from that shown in the drawing by merely loosening the bolt 40 and adjusting and clamping it in various positions between the guide members 36 with respect to the axis of the center of the worm wheel 21 so that various arcs of circles of different radii may be described by the cutting edge of the tool for cutting the material mounted between the live and dead centers of the lathe.

While in the above specification I have provided a simple, compact and efficiently operated lathe tool, it will of course be understood that various modifications from the construction disclosed may be made without departing from the spirit and scope of the invention as expressed in the following claims:

What I claim is my invention and desire to secure by Letters Patent is:

1. A lathe tool comprising a frame, a longitudinally movable member mounted on said frame, a transversely movable member mounted on said first named member, a cutting tool carried by said last named member, a lever pivoted to said first named member, one end of said lever being operatively connected to said second named member, a revolvable gear mounted on said frame, means connecting the other end of said lever to said gear, and manually operable means connected to said gear for transmitting an arcuate movement of a perfect circle to said tool.

2. A lathe tool comprising a frame, a longitudinally movable member mounted on said frame, a transversely movable member mounted on said first named member, a cutting tool carried by said last named member, means including a lever mounted on said frame and operatively connected to both of said members for transmitting an arcuate movement to said tool, and means for varying the size of the arcuate movement described by said tool.

3. A lathe tool comprising a frame, a longitudinally movable member mounted on said frame, a transversely movable member mounted on said first named member, a cutting tool carried by said last named member, means including a pivoted lever mounted on said frame and operatively connected to both of said members for transmitting an arcuate movement to said tool, and means for adjusting said last named means for varying the size of the arcuate movement described by said tool.

4. A lathe tool comprising a frame, a member slidable longitudinally on said frame, a tool supporting member slidable transversely with respect to and mounted on said first named member, a cutting tool adjustably secured to said last named member, a lever pivoted intermediate its ends to said first named member, said tool supporting member being pivoted by a longitudinal slot adjacent the inner end of said lever, a gear journaled in said frame, transversely arranged guide bars carried by said gear forming a diametral slot therebetween, an adjustable stud secured in said slot, there being a longitudinal slot formed adjacent the outer end of said lever embracing said stud, and a manually operable worm meshing with said gear for transmitting an arcuate movement of a perfect circle to said tool.

5. A lathe tool comprising a frame, a member slidable longitudinally on said frame, a tool supporting member slidable transversely with respect to and mounted on said first named member, a cutting tool adjustably secured to said last named member, a lever pivoted intermediate its ends to said first named member, said tool supporting member being pivoted by a longitudinal slot adjacent the inner end of said lever, a gear journaled in said frame, transversely arranged guide bars carried by said gear forming a diametral slot therebetween, an adjustable stud secured in said slot, there being a longitudinal slot formed adjacent the outer end of said lever embracing said stud, a manually operable worm meshing with said gear for transmitting an arcuate movement of a perfect circle to said tool, and means whereby said stud may be adjusted with respect to the axis of said gear for varying the size of the arc described by said tool.

6. A lathe tool comprising a frame, a member slidable longitudinally on said frame, a tool supporting member slidable transversely with respect to and mounted on said first named member, a cutting tool adjustably secured to said last named member, a lever pivoted intermediate its ends to said first named member, said tool supporting member being pivoted by a longitudinal slot adjacent the inner end of said lever, a gear journaled in said frame, transversely arranged guide bars carried by said gear forming a diametral slot therebetween, an adjustable stud secured in said slot, there being a longitudinal slot formed adjacent the outer end of said lever embracing said stud, a worm mounted in said frame meshing with said gear, and a hand wheel connected to said worm for operatively moving said tool.

7. A lathe tool comprising a frame, a member slidable longitudinally on said frame, a tool supporting member slidable transversely with respect to and mounted on said first named member, a cutting tool adjustably secured to said last named member, a lever pivoted intermediate its ends to said first named member, said tool supporting member being pivoted by a longitudinal slot adjacent the inner end of said lever, a gear journaled in said frame, transversely arranged guide bars carried by said gear forming a diametral slot therebetween, an adjustable stud secured in said slot, there being a longitudinal slot formed adjacent the outer end of said lever embracing said stud, there being a transverse slot adjacent the forward end of said first named member embracing said stud, and a manually operable worm meshing with said gear for transmitting an arcuate movement of a perfect circle to said tool.

KENNETH N. NICHOLS.